J. P. FARMER.
HOUSEHOLD GAS FILTER.
APPLICATION FILED AUG. 21, 1911.
1,040,914.
Patented Oct. 8, 1912.
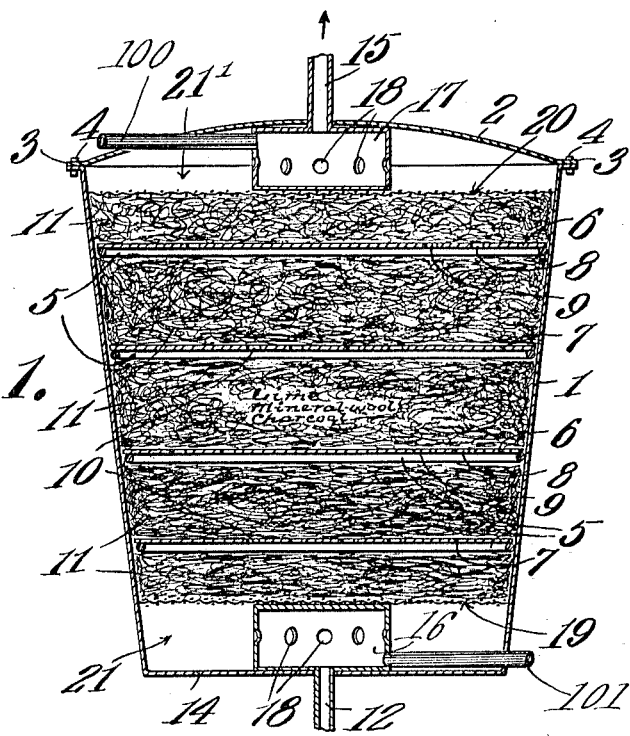
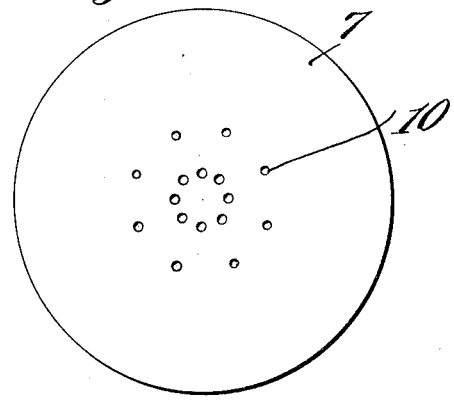
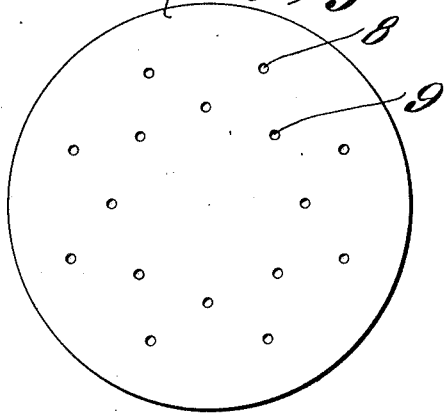
John P. Farmer,
Inventor
Witnesses
by
Attorneys

UNITED STATES PATENT OFFICE.

JOHN PLANT FARMER, OF PORTLAND, OREGON.

HOUSEHOLD GAS-FILTER.

1,040,914. Specification of Letters Patent. Patented Oct. 8, 1912.

Application filed August 21, 1911. Serial No. 645,102.

*To all whom it may concern:*

Be it known that I, JOHN P. FARMER, a citizen of the United States, residing at Portland, in the county of Multnomah and State of Oregon, have invented a new and useful Household Gas-Filter, of which the following is a specification.

It is the object of this invention to provide a gas filter of novel and improved construction, so constituted that the gas, passing through the filter, will travel in sinuous path, thus forcing the gas to encounter a maximum quantity of filtering material.

Another object of the invention is to provide a gas filter equipped with a series of perforated plates for the support of filtering material, the plates being readily removable from the body portion of the filter.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in vertical longitudinal section; Fig. 2 is a top plan of one of the perforated filter plates; and Fig. 3 is a top plan of another of the filter plates.

In carrying out the invention there is provided, as a primary and fundamental element, a receptacle, consisting of a case 1, and a lid 2, constituting a closure for the case. The lid 2 may be secured upon the case 1 in any desired manner. For instance, if desired, the case 1 and the lid 2 may be supplied with outstanding flanges 3, adapted to receive bolts 4, or other securing devices adapted to a like end.

The case 1 may be of any desired cross sectional contour, provided that, as clearly shown in Fig. 1, the side walls of the case flare, as they extend upwardly, the case 1 being preferably, although not necessarily, of frusto-conical form. Secured to the inner wall of the case 1 are a series of vertically spaced stops, these stops preferably taking the form of rings 5. Upon the rings 5, rests a series of plates, denoted by the numerals 6 and 7, the plates diminishing successively in diameter from the top of the receptacle toward the bottom thereof, the construction being such that the plates may readily be mounted successively in place, to rest upon the rings 5 and, with equal facility, be removed, through the flaring upper end of the receptacle.

Alternate plates, preferably the plates denoted by the numeral 6, are provided with concentric rings of openings 8 and 9. The plates 7 which alternate with the plates 6, are equipped, adjacent their centers, with groups of openings 10, these groups of openings being located within an area less than the area defined by the innermost ring 9 of openings in the plates 6. By this construction, when the gas enters the bottom of the device, the gas will be compelled to travel in a sinuous course through the filtering material 11 in which the plates 6 and 7 are embedded, thereby subjecting the gas, in its passage, to a maximum amount of filtering material. This filtering material 11 may be of any suitable construction, and, if desired, different kinds of filtering material may be employed in the same structure, the filtering material ordinarily consisting of lime, mineral wool, charcoal, and the like.

An inlet pipe 12 is extended through the bottom 14 of the case 1, an outlet pipe 15 being extended through the lid 2. To the inner ends of the pipes 12 and 15, drums 16 and 17 are secured, the pipes 12 and 15 obviously communicating with the drums 16 and 17, respectively. The drums are perforated in their side walls as denoted by the numeral 18.

A screen 19, ordinarily of fine mesh wire gauze, rests upon the drum 16, a portion of the filtering material 11 being interposed between the screen 19 and the lowermost plate 7. The lower face of the upper drum 17 bears against a similar screen 20 supported by the filtering material which is interposed between the screen and the uppermost plate 6.

The lower drum 16 serves to space the screen 19 from the bottom 14, thereby defining a gas expansion chamber 21 in the bottom of the case 1. The upper drum 17 serves to space the upper screen 20 from the lid 2, thereby defining another gas expansion chamber 21' in the upper portion of the receptacle, beneath the lid 2.

The openings 18 are placed in the side walls of the drums 16 and 17, between the top and bottoms of the drums. By reason of this construction, the gas, entering the inlet pipe 12, will deposit the heavier portion of its impurities in the drum 16, below the openings 18, the gas passing through the openings 18 and expanding in the chamber 21, to pass upwardly through the screen 19 and through the filtering material 11, the gas, in its upward movement, as hereinbefore pointed out, following a sinuous path through the perforations in the plates 6 and 7.

Should there be any accumulations of foreign matter upon the screen 20, the purified gas, entering the drum 17, will carry none of these impurities into the drum and out of the outlet pipe 15, by reason of the fact that the openings 18 in the drum 17 are located about the plane of the screen 20. Obviously, the screens 19 and 20 serve to prevent the filtering material from finding its way about the drums 16 and 17, to clog the openings 18 therein.

If desired, a lateral pipe 100 may be extended from the drum 17 through the lid 2, a lateral pipe 101 being extended from the drum 16 through the side wall of the case 1. These pipes 100 and 101 will permit the device to be used in positions where there is scant head room, forbidding the use of the pipes 12 and 15.

Having thus described the invention what is claimed is:—

In a device of the class described, a receptacle comprising a case and a lid; an inlet pipe extended through the bottom of the case; an outlet pipe extended through the lid; drums perforated in their side walls and secured to the pipes within the contour of the receptacle; screens in contact with the adjacent faces of the drums and extended entirely across the case, the screens defining openings in the case, around the drums; spaced, perforated plates located within the case between the screens; and filtering material interposed between the plates, and between the terminal plates and the screens.

In testimony that I claim the foregoing as my own, I have hereto affixed my signature in the presence of two witnesses.

JOHN PLANT FARMER.

Witnesses:
E. F. ALLSHAW,
GEO. M. RIXLEY.